US008292060B2

(12) United States Patent
Wünsche et al.

(10) Patent No.: US 8,292,060 B2
(45) Date of Patent: Oct. 23, 2012

(54) APPARATUS AND METHOD FOR FORMING A PACK SEQUENCE

(75) Inventors: Dieter Wünsche, Straubing (DE); Peter Tiebel, Bad Abbach (DE)

(73) Assignee: Krones AG, Neutraubling (DE)

( * ) Notice: Subject to any disclaimer, the term of this patent is extended or adjusted under 35 U.S.C. 154(b) by 140 days.

(21) Appl. No.: 12/879,050

(22) Filed: Sep. 10, 2010

(65) Prior Publication Data

US 2011/0061992 A1    Mar. 17, 2011

(30) Foreign Application Priority Data

Sep. 11, 2009 (DE) .......... 10 2009 041 239

(51) Int. Cl.
*B65G 37/00* (2006.01)
(52) U.S. Cl. .................................. 198/347.4
(58) Field of Classification Search ............... 198/347.1, 198/347.4
See application file for complete search history.

(56) References Cited

U.S. PATENT DOCUMENTS

| | | | |
|---|---|---|---|
| 3,122,231 A * | 2/1964 | Pence et al. | 198/347.4 |
| 3,173,557 A * | 3/1965 | Eliassen | 198/347.4 |
| 3,247,929 A * | 4/1966 | Langley | 198/368 |
| 5,007,521 A * | 4/1991 | Tanaka | 198/347.4 |
| 5,230,206 A * | 7/1993 | Christ | 53/501 |
| 5,267,821 A * | 12/1993 | Bodart et al. | 198/347.4 |
| 5,308,001 A * | 5/1994 | Grecksch et al. | 198/347.4 |
| 5,943,841 A | 8/1999 | Wunscher | |
| 6,405,100 B1 | 6/2002 | Christ | |

FOREIGN PATENT DOCUMENTS

| | | |
|---|---|---|
| EP | 0183074 A1 | 6/1986 |
| EP | 0471150 A2 | 2/1992 |

OTHER PUBLICATIONS

German Search Report for DE102009041239.5 dated Jun. 28, 2010.

* cited by examiner

*Primary Examiner* — James R Bidwell
(74) *Attorney, Agent, or Firm* — Marshall, Gerstein & Borun LLP

(57) ABSTRACT

A method for forming a pack sequence, particularly packs of one or a plurality of articles, particularly beverage articles, including a sequence forming device, with a pack storing device for storing packs being connected to the sequence forming device via at least one transport path, the method including: transporting a pack along the at least one transport path from the pack storing device to the sequence forming device, wherein the transport of the pack is controlled such that the pack is introduced into the sequence forming device at a predetermined time.

10 Claims, 2 Drawing Sheets

APPARATUS AND METHOD FOR FORMING A PACK SEQUENCE

CROSS-REFERENCE TO RELATED APPLICATION

The present application claims the benefit of priority of German Application No. 102009041239.5, filed Sep. 11, 2009. The entire text of the priority application is incorporated herein by reference in its entirety.

FIELD OF THE DISCLOSURE

The present disclosure relates to an apparatus and a method for forming a pack sequence, particularly packs of one or a plurality of beverage articles, comprising a sequence forming device, with a pack storing device for storing packs being connected to the sequence forming device via at least one transport path.

BACKGROUND

Especially in the beverage industry, a pack sequence is often formed from different packs that are order-picked in a customer-specific way to form a group of packs, particularly a target pallet. A sequence forming element is often provided for this purpose, the sequence forming element taking packs from upstream buffer places and combining said packs to obtain the customer-specific pack sequence.

The target pallet may be a pallet mixed from a plurality of different packs, particularly according to specifications given in customer orders. The mixed pallet, however, may also represent preparatory work, forming the basis for a further order-picking stage. The customer-specific pallet or target pallet may be a group consisting of one or several different packs, particularly a mixed pallet, particularly according to specifications given in one or several customer orders or according to specifications given in one or several orders for supporting further internal as well as external business processes, e.g. distributing, mounting, repacking, customizing, order-picking, etc.

The buffer places are normally occupied via a pack storing device loaded with packs of particularly homogeneous groups of packs, particularly production pallets. Such a pack storing device normally comprises a plurality of planes, each of the planes comprising a plurality of storage lanes. The storage lanes are homogeneously loaded most of the time, i.e., each storage lane comprises packs of only one beverage article. Partial sequences are normally combined on a conveyor for each plane of the pack storing device and provided at buffer places before the sequence forming element.

It is also possible that different articles are stored in a pack storing device. This is e.g. the case whenever in a preceding business process e.g. of a manual order-picking stage mixed sequences have been formed.

Since the pack sequences in an order-picking line may turn out to be very different, a great number of buffer places are needed for ensuring that a needed pack is available in good time for introduction into the sequence forming element. Pack sequences can particularly greatly differ in the order of the packs and also in the physical properties of the packs. When pack sequences are formed, there may be very high throughputs that may subsequently require a great number of buffer places before the sequence forming devices, especially when the times needed for the provision from the sources, the pack storing devices, up to the sequence forming device, are longer than the necessary reaction time predetermined by the performance requirements of the sinks, i.e. the sequence forming devices.

This calls for a lot of space and for a corresponding dimensioning of the order-picking line.

SUMMARY OF THE DISCLOSURE

It is therefore an aspect of the present disclosure to provide an apparatus and a method for performing the formation of pack sequences in an order-picking line in a more space-saving way and under less technical efforts and at lower costs.

The method according to the disclosure for forming a pack sequence, particularly packs of one or several articles, particularly beverage articles, comprising a sequence forming device, with a pack storing device for storing packs being connected to the sequence forming device via at least transport path, comprises transporting a pack along the at least one transport path from the pack storing device to the sequence forming device, wherein transportation of the pack is controlled in such a manner that the pack is introduced into the sequence forming device at a predetermined time.

Thanks to the controlled transportation of the pack, buffer places before the sequence forming device can be saved. This reduces the space needed for the order-picking line.

A pack can stand for the entity of packaged good and packaging. A pack may conform to a stock keeping unit (SKU). Particularly, a pack can conform to a beverage article of a beverage and the associated package. A pack can also conform to a large pack, a large pack comprising a plurality of single packs. For instance, a pack may be a beverage crate with bottles filled with a beverage. A pack may also be a carton or a shrink pack.

The packs may be packs of one or several beverage articles and/or foods, commercial products and/or containers or packets in general.

The pack sequence can be particularly ordered with respect to the packs. The pack sequence may comprise one or several partial sequences. The pack sequence to be formed can comprise at least one pack, particularly two or more packs. The packs of the pack sequence to be formed may be packs of one or several, particularly different, articles, particularly beverage articles.

In other words, the pack sequence to be formed may conform to a quantity of packs, comprising one or several partial sequences or subsets of packs, particularly partial sequences of different packs.

The method for forming a pack sequence may be an automatic or automated method.

The sequence forming device may conform to a continuous conveyor, particularly a spiral conveyor, or comprise a continuous conveyor, particularly a spiral conveyor.

The at least one transport path can terminate in the sequence forming device, particularly in the spiral conveyor or continuous conveyor of the sequence forming device. In other words, a pack can be introduced via the at least one transport path into the sequence forming device, particularly into the spiral conveyor or the continuous conveyor of the sequence forming device.

The transport path may comprise one or several conveying elements, particularly one or several continuous conveyors, or may conform to a conveying element. The conveying element may e.g. be a roller conveyor, a belt conveyor and/or a chain conveyor. The transportation of a pack along the at least one transport path can be carried out through the dead weight of the pack and/or by driving.

The pack storing device or pack buffer can comprise several storage elements, particularly storage lanes, for storing packs. The storage lanes of the pack storing device can particularly be arranged in different vertical planes. Each storage lane of the pack storing device can be homogeneous, i.e. comprise packs of only one beverage article.

Each storage lane of the pack storing device can be connected to the sequence forming device through a transport path. Transport paths of storage lanes of one plane of the pack storing device can conform to different path sections of a conveying element. Transport paths of different storage lanes can then differ in their length. A conveying element may also be provided for each storage lane. In this instance each transport path may conform to a conveying element.

The transport of a pack along the at least one transport path can be controlled by controlling the start time of the transport and/or by controlling the speed of the transport of the pack along the at least one transport path.

Moreover, the method can encompass determining a start time for the transport based on the duration for conveying a pack along the at least one transport path. The conveyance period can be determined based on the length of the transport path and the speed at which a pack is transported along the transport path. The method can particularly comprise determining the duration for conveying a pack along the at least one transport path.

The method for determining start times for the respective transportation can also take into account buffer or safety times, differently for each storage lane or each required conveying path along a transport path, which then requires buffering of the packs before the sequence forming device. These buffer or safety times can preferably be dimensioned such that the sequence formation is not disturbed, e.g. by overtaking within a planned sequence.

Moreover, the method comprises receiving an order for forming a pack sequence and determining at least one point of time at which a pack of the order must be introduced into the sequence forming device. The order for forming a pack sequence can conform to an order-picking order. The order can comprise the pack sequence to be fowled or a part thereof.

For each pack of the order the method may comprise determining a point of time at which a pack of the order must be introduced into the sequence forming device.

The at least one point of time determined after reception of an order can conform to the predetermined point of time at which the pack is introduced into the sequence forming device. Specifically, the determination of a start time for the transport can be carried out based on the period for conveying the pack along the at least one transport path and on the predetermined time.

The sequence forming device can comprise a conveying medium, wherein a path of the conveying medium that is physically available for conveying a pack is extended by a virtual conveying path.

The virtual extension can be carried out by a control element, for instance a software module, for controlling the order-picking line. Virtual extension can mean that the path available for conveying the pack is mathematically extended. In other words, the path of the conveying medium of the sequence forming device which is provided for conveying a pack and on which the control of the line or system is based may be greater by a virtual path portion than the physical time available for conveying a pack.

The path with virtual and physical portions can be subdivided into virtual sections. This enables a control of the system in window technique, i.e. the assignment of a section or window of the conveying medium to a pack, particularly to an order, and tracking the same on the conveying medium. In other words, a pack can be allocated to a section by an order virtually or mathematically.

The at least one transport path between pack storing device and sequence forming device can also be subdivided virtually into sections. In this instance, virtually may also mean that the at least one transport path is mathematically subdivided, particularly by a control element, into sections or windows.

A section of the at least one transport path can be synchronized with a section of the conveying medium of the sequence forming device, especially wherein two sections synchronized in this way are simultaneously present at an introduction point of the at least one transport path into the conveying medium of the sequence forming device. It is thereby possible to arrange a predetermined pack on a predetermined virtual section of the conveying medium. Hence, the sequence forming device can conform to a synchronizing device.

In other words, the method for forming a pack sequence may comprise receiving an order for forming a pack sequence, the order allocating a pack to a virtual section of the virtually extended path of the conveying medium of the sequence forming device, wherein the section with the virtually allocated pack is moved by the movement of the conveying medium of the sequence forming device, and wherein the transportation of a pack along the at least one transport path comprises a synchronization of a section of the at least one transport path with the section with the virtually allocated pack of the conveying medium.

The method can particularly comprise arranging a pack on the synchronized section of the at least one transport path. The pack can here be taken from a storage lane, especially after the storage lane and thus the pack have been determined on the basis of the order.

Since the sections are synchronized, the pack and the section of the conveying medium can be simultaneously present at an introduction point of the sequence forming device. The pack can thereby be arranged on the section of the virtually extended conveying medium. For a robust operation in practice, buffer or safety times can here be taken into account in a selective way.

The sequence of packs can comprise a plurality of packs, particularly two or more packs, with the steps in each of the above-described methods being carried out for each pack of the sequence.

Particularly, the method for forming a pack sequence can comprise transporting the pack along the at least one transport path from the pack storing device to the sequence forming device for each pack of the pack sequence, the transport of the pack being controlled such that the pack is introduced into the sequence forming device at a predetermined time.

A plurality of sequence forming devices may also be provided. Particularly, in a facility or in a total system a plurality of sequence forming devices can be linked sequentially, in parallel or in another configuration, and especially these, in turn, can be included according to one of the above-described methods in the control of the pack transportation in the facility or in the total system.

Moreover, the disclosure provides an apparatus for forming a pack sequence, particularly of packs of one or several articles, particularly beverage articles, comprising a sequence forming device for forming the sequence of packs; a pack storing device for storing packs; at least one transport path connecting the pack storing device to the sequence forming device, and a control element configured to control the transport of a pack along the at least one transport path in such a way that the pack is introduced into the sequence forming device at a predetermined time.

The apparatus, particularly the sequence forming device, the pack storing device, the at least one transport path and/or the control element can comprise one or a plurality of the above-described features.

The apparatus may be part of an order-picking line or conform to an order-picking system.

BRIEF DESCRIPTION OF THE DRAWINGS

Further features and advantages are now explained with reference to the exemplary figures, of which.

DETAILED DESCRIPTION OF THE PREFERRED EMBODIMENT

Figure 1:
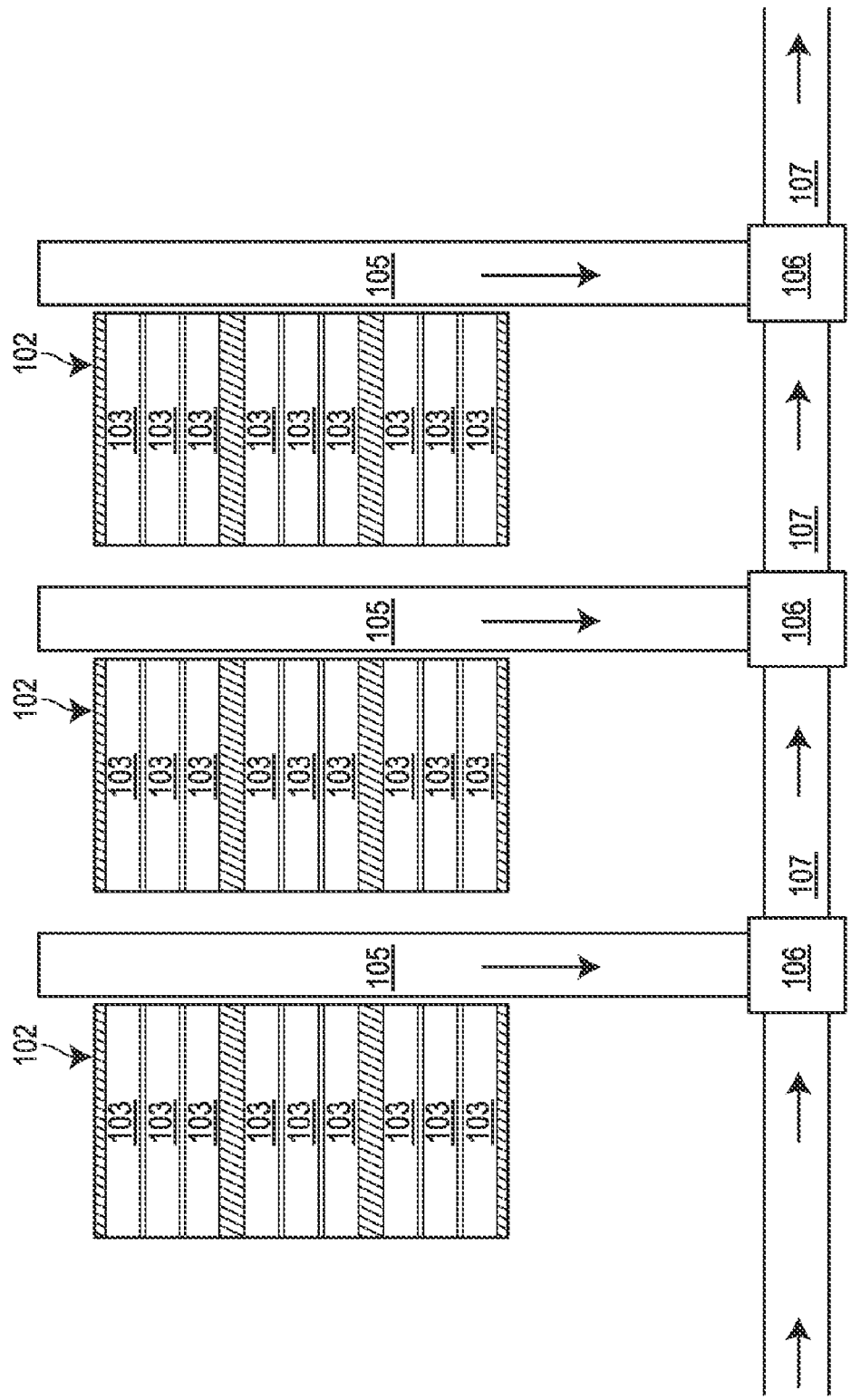
FIG. 1 shows an exemplary apparatus for forming a pack sequence with a plurality of linked sequence forming devices.

FIG. 1 shows an exemplary apparatus for forming a pack sequence, the apparatus comprising three pack storing devices 102, which in turn comprise a plurality of storage lanes 103 terminating in conveying elements 105. Each of the conveying elements 105 is connected to a sequence forming device 106. The sequence formed can then be provided on a conveying medium 107 or transported away.

Each of the conveying elements 105 can correspond to a feed conveyor, particularly to a feed conveyor belt. Each of the sequence forming devices 106 can comprise a discharge conveyor belt.

The sequence forming devices 106 or synchronizing device may particularly be a continuous conveyor, particularly a spiral conveyor. Further sequence forming devices 106 may also be provided or linked, as can be seen in FIG. 1. The plurality of storage lanes 103 of a plane of the pack storing device are connected to the sequence forming device 106 via a respective transport path. The transport paths are arranged on the conveying element 105; they particularly correspond to the path sections of the conveying element 105. Both the transport path between each of the storage lanes 103 and each of the sequence forming devices 106 as well as the conveying medium of the sequence forming devices 106 can be subdivided into sections or windows.

Figure 2:
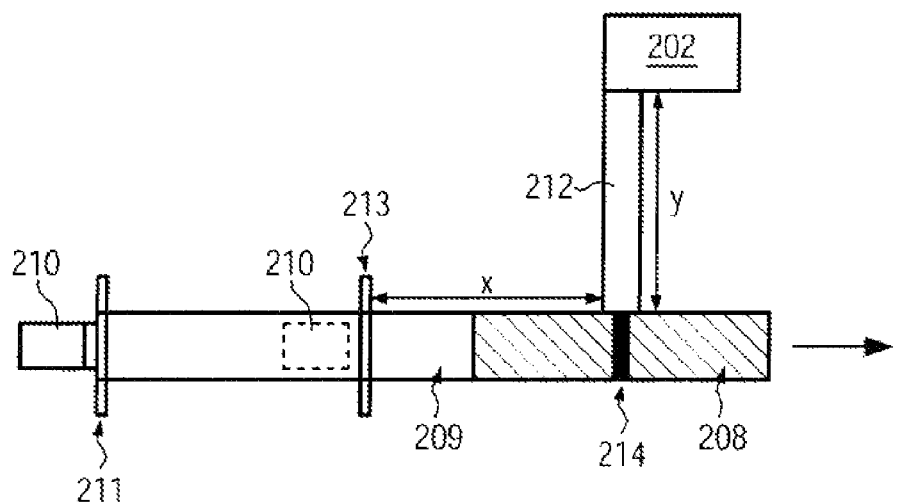
FIG. 2 illustrates a virtual extension of a path of a conveying medium of a sequence forming device, the path being available for conveying a pack.

FIG. 2 illustrates a virtual extension of the path of a conveying medium of a sequence forming device, the path being available for conveying a pack. The virtual extension as well as the whole control of the exemplary apparatus for forming a pack sequence can be carried out by means of a corresponding software module.

FIG. 2 shows the real, physically available path 208 of the conveying medium of the sequence forming device and its virtual extension 209. The virtually extended path can be subdivided into virtual sections. FIG. 2 gives an example of such a virtual section 210.

After receipt of an order a pack can be allocated virtually to one of the virtual sections, e.g. the exemplary section 210. This can e.g. be done at the beginning 211 of the virtual path, i.e. as soon as the virtual section 210 is available. The exemplary section 210 is moved by the movement of the conveying medium along the virtual path.

The introduction place or introduction point 214 at which an exemplary conveying path 212 terminates in the physical path 208 is shown in FIG. 2. When the exemplary section 210 reaches the introduction point 214, the ordered pack, which has been allocated to the section 210, is to be arranged on section 210. The time at which the pack is to be introduced into the sequence forming device, particularly into the physical path 208, is to be determined for this purpose. Based on the duration for conveying the pack from the pack storing device 202 to the introduction point 214, a start time can then be determined for the transportation of the pack. As soon as the exemplary section 210 has passed beyond position 213, the transport of the pack from the pack storing device 202 to the introduction point 214 of the sequence forming device can be started. In this example, the path between the position 213 and the introduction point 214, x, is equal to the transport path, y, between the pack storing device 202 and the introduction point 214, i.e. x=y. In this instance the conveying speed on the exemplary transport path 212 equals the conveying speed on the conveying medium of the sequence forming device.

The speeds of the conveying path and of the conveying medium can also differ. In this case the time needed by a window allocated to a transport order on the conveying medium of the sequence forming device up to the introduction point 214 can be equal to the time needed by a window or section with the same transport order and loaded with the physical pack from the pack storing device 202 over the transport path 212 up to the introduction point 214 into the allocated window 210 on the conveying medium of the sequence forming device.

Figure 3:
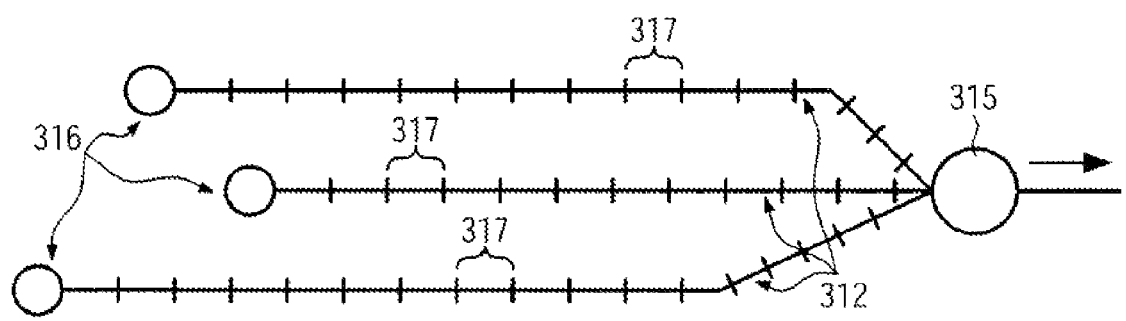
FIG. 3 illustrates virtual sections on exemplary transport paths of a pack storing device to a sequence forming device.

FIG. 3 shows an illustration of an exemplary method for forming a pack sequence. Specifically, FIG. 3 schematically shows three pack sources 316, which may e.g. correspond to storage lanes of a pack storing device. The sources 316 are connected to a synchronization point 315 via transport paths 312. The synchronization point 315 can e.g. correspond to the sequence forming device, particularly to the introduction point of the transport path into a conveying medium of the sequence forming device. The exemplary transport paths 312 can correspond to different conveying elements or different path sections of a conveying element.

Moreover, FIG. 3 shows exemplary sections or windows 317 on the transport paths 312 moving towards the synchronization point 315 due to the movement of the conveying element between sources 316 and synchronization point 315. The exemplary sections 317 can conform to time windows or time units. To cope with the transport paths 312, a defined or predetermined number of time windows or time units are always needed based on this division. In other words, an exemplary section 317 needs a predetermined or defined duration for its passage along the transport path 312.

Viewed from the synchronization point 315, the transport of a pack along an exemplary transport path 312 may be organized or controlled such that the transportation of a pack is started at a source 316 in such a manner that the moved section 317 with the pack arranged thereon arrives at the synchronization point 315 at a desired or predetermined point of time.

It goes without saying that features indicated in the previously described embodiments are not limited to these special combinations and that they are also possible in any other combination.

What is claimed is:

1. A method for forming a pack sequence, particularly packs of one or a plurality of articles, particularly beverage articles, comprising a sequence forming device, with a pack storing device for storing packs being connected to the sequence forming device via at least one transport path, comprising:

transporting a pack along the at least one transport path from the pack storing device to the sequence forming device, wherein the transport of the pack is controlled such that the pack is introduced into the sequence forming device at a predetermined time; and wherein a start point for the transportation is determined based on the duration for conveying a pack along the at least one transport path.

2. The method according to claim 1, and receiving an order for forming a pack sequence, and determining at least one point of time at which a pack of the order must be introduced into the sequence forming device.

3. The method according to claim 1, wherein the sequence forming device comprises a conveying medium, and wherein a path of the conveying medium that is physically available for conveying a pack is virtually extended by a conveying path.

4. The method according to claim 3, wherein the virtually extended path is virtually subdivided into sections.

5. The method according to claim 4, wherein a pack is virtually allocated by an order to a section.

6. The method according to claim 1, wherein the at least one transport path between pack storing device and sequence forming device is virtually subdivided into sections.

7. The method according to claim 6, wherein a section of the at least one transport path is synchronized with a section of the conveying medium of the sequence forming device.

8. The method according to claim 1, wherein the sequence of packs comprises a plurality of packs, and wherein the method steps are carried out for each pack of the sequence.

9. The method according to claim 7, wherein two sections synchronized in this way are simultaneously present at an introduction point of the at least one transport path into the conveying medium of the sequence forming device.

10. An apparatus for forming a sequence of packs, particularly packs of one or a plurality of articles, particularly beverage articles, comprising:

a sequence forming device for forming the sequence of packs;

a pack storing device for storing packs;

at least one transport path connecting the pack storing device to the sequence forming device, and a control element configured to control the transport of a pack along the at least one transport path in such a way that the pack is introduced into the sequence forming device at a predetermined time and to determine a start point for the transportation based on the duration for conveying a pack along the at least one transport path.

* * * * *